(12) United States Patent
De Jong et al.

(10) Patent No.: US 7,759,438 B2
(45) Date of Patent: Jul. 20, 2010

(54) POLYMERIZATION PROCESS FOR PREPARING (CO)POLYMERS

(75) Inventors: Johannes Jacobus Theodorus De Jong, Westervoort (NL); Johannes Willibrordus Antonius Overkamp, Lemelerveld (NL); Andreas Petrus Van Swieten, Velp (NL); Koen Antoon Kornelis Vanduffel, Deventer (NL); Hans Westmijze, Bathmen (NL)

(73) Assignee: Akzo Nobel N.V., Arnhem (NL)

( * ) Notice: Subject to any disclaimer, the term of this patent is extended or adjusted under 35 U.S.C. 154(b) by 1039 days.

(21) Appl. No.: 10/561,165

(22) PCT Filed: Jun. 18, 2004

(86) PCT No.: PCT/EP2004/006601

§ 371 (c)(1),
(2), (4) Date: Jan. 31, 2006

(87) PCT Pub. No.: WO2005/000916

PCT Pub. Date: Jan. 6, 2005

(65) Prior Publication Data

US 2006/0142513 A1 Jun. 29, 2006

Related U.S. Application Data

(60) Provisional application No. 60/498,271, filed on Aug. 27, 2003.

(30) Foreign Application Priority Data

Jun. 27, 2003 (EP) ................. 03077008

(51) Int. Cl.
C08F 4/38 (2006.01)
C07C 409/04 (2006.01)
C08F 14/06 (2006.01)

(52) U.S. Cl. .......... 526/81; 526/86; 526/208; 526/211; 526/228; 526/230.5; 502/160; 568/559; 252/186.23; 252/186.26; 252/407

(58) Field of Classification Search ............. 526/81, 526/228, 230.5, 86, 208, 211; 568/559; 502/160; 252/186.23, 186.26, 407
See application file for complete search history.

(56) References Cited

U.S. PATENT DOCUMENTS

| | | | | |
|---|---|---|---|---|
| 123,591 A | | 2/1872 | Stock | |
| 2,632,758 A | * | 3/1953 | Brothman | 526/73 |
| 3,022,282 A | * | 2/1962 | Marous et al. | 526/228 |
| 3,451,985 A | * | 6/1969 | Mahlo | 526/86 |
| 3,778,422 A | | 12/1973 | Farber et al. | |
| 3,787,527 A | * | 1/1974 | Meyer et al. | 525/16 |
| 5,096,988 A | * | 3/1992 | Amano et al. | 526/200 |
| 5,155,192 A | | 10/1992 | Boelema et al. | |
| 5,478,900 A | * | 12/1995 | Amano et al. | 526/88 |
| 5,541,151 A | | 7/1996 | Sanchez | |
| 5,892,090 A | * | 4/1999 | Frenkel | 558/261 |
| 6,399,728 B1 | | 6/2002 | Myers et al. | |
| 2002/0123591 A1 | | 9/2002 | Van Swieten et al. | |
| 2004/0162438 A1 | | 8/2004 | Hagel et al. | |

FOREIGN PATENT DOCUMENTS

| | | | |
|---|---|---|---|
| CA | 02198814 | * | 2/1997 |
| EP | 0 810 213 A2 | | 12/1997 |
| EP | 0 853 082 A1 | | 7/1998 |
| JP | A 2003-252920 | | 9/2003 |
| WO | WO 02/051802 A1 | | 7/2002 |
| WO | WO 04/000799 A1 | | 12/2003 |

OTHER PUBLICATIONS

U.S. Appl. No. 60/390,799, filed Jun. 20, 2002, Vanduffel et al.
U.S. Appl. No. 10/411,182, filed Oct. 23, 2003, Westmijze et al.
U.S. Appl. No. 10/497,993, filed Apr. 14, 2005, Meulenbrugge et al.
U.S. Appl. No. 10/552,437, filed Oct. 6, 2005, Boevenbrink et al.
U.S. Appl. No. 10/553,971, filed Oct. 19, 2005, Westmijze et al.
U.S. Appl. No. 10/498,542, filed Mar. 10, 2005, Westmijze et al.
U.S. Appl. No. 10/559,775, filed Dec. 7, 2005, Meulenbrugge et al.

* cited by examiner

Primary Examiner—Fred M Teskin
(74) Attorney, Agent, or Firm—Kenyon & Kenyon LLP

(57) ABSTRACT

The present invention relates to an aqueous dispersion polymerization process for preparing a (co)polymer wherein an organic peroxide is used as initiator (as a source of free radicals) during the polymerization process in conjunction with an effective amount of an organic peroxide stabilizing additive (controlling agent). The invention also relates to formulations comprising an organic peroxide and an effective amount of an organic peroxide stabilizing additive suitable for use in said polymerization process. The invention finally relates to 10 (co)polymers obtainable by the dispersion polymerization process.

15 Claims, 1 Drawing Sheet

Figure 1: Temperature vs. time profile for the mini-HAST test of the emulsions of Examples 1-4 and Comparative Examples A and B.
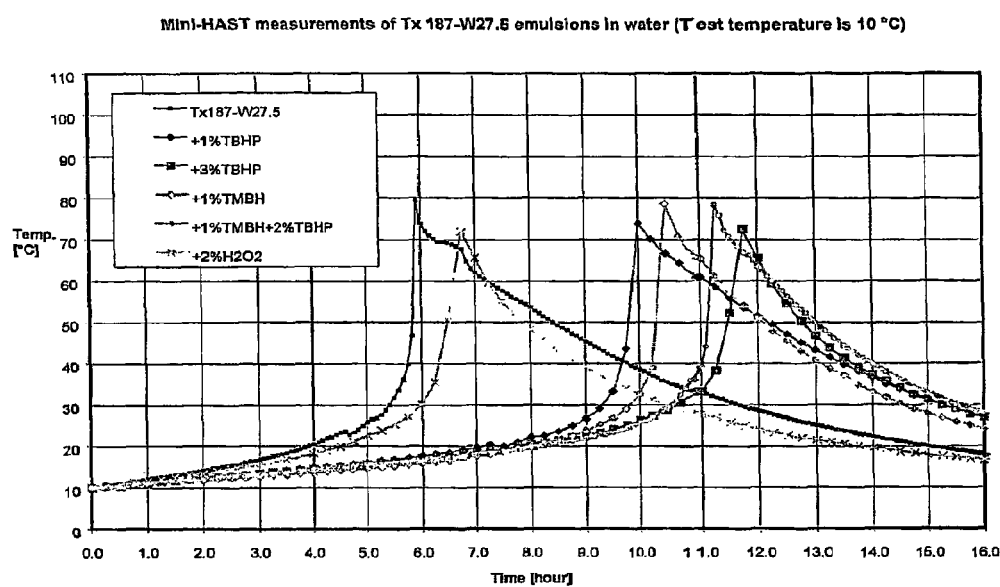

US 7,759,438 B2

POLYMERIZATION PROCESS FOR PREPARING (CO)POLYMERS

FIELD OF THE INVENTION

The present invention relates to an aqueous dispersion polymerization process for preparing a (co)polymer wherein one or more organic peroxides are used as initiator (as a source of free radicals) in conjunction with an effective amount of one or more controlling agents. The invention also relates to formulations comprising organic peroxide(s) and an effective amount of said controlling agent(s) suitable for use in said aqueous dispersion polymerization process. The invention finally relates to (co)polymers obtainable by the dispersion polymerization process.

BACKGROUND

Over the years, there has been a large number of publications describing the polymerization of ethylenically unsaturated monomers using an organic peroxide as initiator. For example, U.S. Pat. No. 5,155,192 discloses storageable and/or transportable compositions containing peroxydicarbonate to which an organic peroxide has been added to retard the decomposition of said peroxy-dicarbonate. The compositions of U.S. Pat. No. 5,155,192 are suitable for use in the conventional mass, suspension, or emulsion (co)polymerization of ethylenically unsaturated monomers. In U.S. Pat. No. 5,155,192 no further specifications of the peroxydicarbonates to be used are given, such as their solubility or their half life.

An unwanted side effect frequently observed in conventional polymerization processes is the formation of so-called fish eyes in the (co)polymer. One explanation for fish eyes is that they are caused by small quantities of polymer material having a molecular weight that differs considerably from the average molecular weight of the rest of the polymer material. Due to a difference in melt property between said polymer material and the "average" polymer material, irregularities can occur in the final shaped polymer material. It will be clear that this phenomenon is undesirable, for example, for the transparency and uniformity of the final (co)polymer material, particularly in thin films. Furthermore, the presence of fish eyes may even be detrimental to the strength of this material. The presently known conventional polymerization processes have failed to resolve the fish eye problem of (co)polymers satisfactorily.

Hence, it is an objective of the present invention to provide a new process for preparing (co)polymers overcoming the drawbacks of conventional polymerization processes, which process is pre-eminently suited for preparing a (co)polymer with reduced levels of fish eyes at high initiator loads.

US 2002/0123591 discloses the emulsion or suspension polymerization of vinyl chloride monomers, using an organic peroxide that is dosed at least partly to the polymerization mixture at the reaction temperature and wherein essentially all the peroxide has a half life of from 0.05 to 1.0 hour at the polymerization temperature. It is said that a low fish eye level is acquired using this polymerization process.

We have found that (co)polymers with a further reduced level of fish eyes are obtained in an aqueous dispersion polymerization process wherein one or more organic peroxides to be used as initiator are selected from the group consisting of diacyl peroxides, peroxyesters, specific peroxydicarbonates, and mixtures thereof, in conjunction with an effective amount of one or more suitable controlling agents selected from the group consisting of organic hydroperoxides, ethylenically unsaturated organic compounds that preferably cannot homo-polymerize (i.e. form polymers obtained by self-polymerization), compounds with labile carbon-hydrogen bonds, oximes, and mixtures thereof. More preferably, it is an aqueous suspension or emulsion polymerization process. Most preferably, it is an aqueous suspension polymerization process.

We have found that the level of fish eyes is reduced more than would be expected on the basis of US 2002/0123591 by using the process according to the present invention. This is probably due to a synergetic effect caused by using the organic peroxides, controlling agents, and process conditions according to the current invention.

BRIEF DESCRIPTION OF THE DRAWING

FIG. 1: Temperature vs. time profile for the mini-HAST test of the emulsions of Examples 1-4 and Comparative Examples A and B.

BRIEF DESCRIPTION OF THE INVENTION

The term "controlling agent" is used to describe compounds and mixtures thereof that have a beneficial effect on the polymerization process wherein one or more organic peroxides are used as initiator, as a result of which a final polymer material having a reduced level of fish eyes is obtained. According to a non-binding theory, it is believed that the effect of the controlling agent can be explained at least partly by the fact that the controlling agent traps radicals initially formed by the initiator. In consequence, the remaining initiator has more time to distribute homogeneously in the polymerization reaction mixture, which eventually is beneficial to the reduction of the level of fish eyes.

In one embodiment of the present invention, the polymerization process is a conventional aqueous dispersion polymerization process or an aqueous dispersion polymerization process wherein at least part of the one or more organic peroxides used as initiator is dosed to the reaction mixture at the polymerization temperature, wherein the one or more organic peroxides are selected from the group consisting of diacyl peroxides, peroxyesters, peroxydicarbonates, and mixtures thereof, in conjunction with an effective amount of one or more controlling agents selected from the group consisting of organic hydroperoxides, ethylenically unsaturated organic compounds that preferably cannot homo-polymerize, compounds with labile carbon-hydrogen bonds, oximes, and mixtures thereof, with the proviso that the solubility of the peroxydicarbonate(s) in water at 0° C. is at least 5 ppm, as determined by the test described herein.

In a preferred embodiment of the present invention, in the polymerization process the one or more organic peroxides are selected from the group consisting of diacyl peroxides, peroxyesters, and mixtures thereof.

In a more preferred embodiment of the present invention, in the polymerization process the one or more organic peroxides are selected from the group consisting of organic peroxides having a half-life of at least 0.0001 hour and at most 1.0 hour at the polymerization temperature.

In yet another preferred embodiment of the process according to the invention, the solubility of the peroxyester and/or diacylperoxide in water at 0° C. also is at least 5 ppm, as determined by the test described herein.

In a further embodiment, the present invention relates to a formulation suitable for use in an aqueous dispersion polymerization process of the present invention, said formulation comprising one or more organic peroxides selected from the group consisting of diacyl peroxides, peroxyesters, peroxydicarbonates, and mixtures thereof, and an effective amount of one or more controlling agents selected from the group consisting of organic hydroperoxides, ethylenically unsaturated organic compounds that preferably cannot homopolymerize, compounds with labile carbon-hydrogen bonds, oximes, and mixtures thereof, with the proviso that the solubility of the peroxydicarbonate(s) in water at 0° C. is at least 5 ppm, as determined by the test as described herein.

In a preferred embodiment of the formulation, the solubility of the peroxyester and/or diacylperoxide in water at 0° C. also is at least 5 ppm, as determined by the test described herein.

In yet a further embodiment, the present invention relates to a formulation suitable for use in an aqueous dispersion polymerization process of the present invention, wherein the formulation comprises one or more organic peroxides selected from the group consisting of organic peroxides having a half-life of at least 0.0001 hour and at most 1.0 hour at the polymerization temperature.

In a preferred embodiment, the invention relates to a formulation suitable for use in an aqueous dispersion polymerization process of the present invention, said formulation comprising one or more organic peroxides selected from the group consisting of diacyl peroxides of formula I as described below, and an effective amount of dibutyl maleate as controlling agent.

In another preferred embodiment, the invention relates to a formulation suitable for use in an aqueous dispersion polymerization process of the present invention, said formulation comprising one or more organic peroxides selected from the group of diacyl peroxides of formula I as described below, peroxyesters of formula II as described below, and mixtures thereof, and an effective amount of an organic hydroperoxide as controlling agent, provided that it does not relate to a formulation covered by patent application WO 2004/000799. More specifically, the invention relates to a formulation suitable for use in an aqueous dispersion polymerization process of the present invention, said formulation comprising one or more organic peroxides selected from the group of diacyl peroxides of formula I as described below, peroxy-esters of formula II as described below, and mixtures thereof, and an effective amount of an organic hydroperoxide as controlling agent, provided that it does not relate to a formulation comprising a peroxide of the formula R—O—C(O)—O—O—C(O)—O—R' wherein R and R' are independently selected from branched or non-branched, substituted or unsubstituted alkyl, alkenyl, or cycloalkyl $C_1$-$C_{20}$ hydrocarbon moieties and a phlegmatizing agent according to the formula R"HC=CHR'", wherein R" and R'" are independently selected from hydrogen and the group consisting of linear or branched, substituted or unsubstituted, saturated or unsaturated $C_1$-$C_{12}$ alkane moieties and R" and R'" may be connected to form a cyclic structure. Preferably, the formulation according to this invention is phlegmatizing agent-free, which means that it contains less than 5 wt % on the total composition of the above phlegmatizing agent, preferably less than 4 wt %, more preferably less than 2 wt %, most preferably less than 1 wt %.

The Controlling Agent

Hydroperoxides that are suitable for use as controlling agents in the present invention are well-known compounds, many of which are commercially available. They are of the general formula ROOH, wherein R represents an organic group, but not a hydrogen atom, more particularly wherein R represents a branched or non-branched, substituted or unsubstituted alkyl group, alkenyl group, alkynyl group, or cycloalkyl group. R generally does not have more than 40 carbon atoms, preferably not more than 20 carbon atoms, and more preferably not more than 12 carbon atoms. As examples of suitable substituents of the R group may be mentioned the hydroperoxy group, the phenyl group, and the hydroxyl group. Examples of particularly preferred hydroperoxides include methyl hydroperoxide, ethyl hydroperoxide, n-propyl hydroperoxide, isopropyl hydroperoxide, sec-butyl hydroperoxide, isobutyl hydroperoxide, 1-phenyl-1-hydroperoxy ethane, benzyl hydroperoxide, methylethyl ketone hydroperoxide, i.e. a mixture of 2,2'-dihydroperoxy-2-2'-di-n-butyl peroxide and 2,2-dihydro-peroxy butane, cyclohexanone hydroperoxide, i.e. a mixture of 1,1'-dihydro-peroxy-1,1'-dicyclohexyl peroxide and 1,1-dihydroperoxy cyclohexane, and cyclohexyl hydroperoxide. It is preferred to use tertiary hydroperoxides, i.e. hydroperoxides having one or more hydroperoxy groups linked to tertiary carbon atoms. Examples of particularly preferred tertiary hydroperoxides are tert-butyl hydroperoxide (TBHP), tert-amyl hydroperoxide (TAHP), 1,1,3,3-tetramethylbutyl hydroperoxide (TMBH), 2-hydroperoxy-2-methyl pentane, 2-hydroperoxy-2-methyl-3-butene, 2-hydroperoxy-2,4,4-trimethyl pentane, 2,5-dihydroperoxy-2,5-dimethyl hexane, 2,5-dihydroperoxy-2,5-dimethyl-3-hexyn, 2,6-dihydroperoxy-4-hydroxy-2,6-dimethyl heptane, 2-hydroperoxy-4-hydroxy-2-methyl butane, 2-hydroperoxy-4-hydroxy-2-methyl pentane, 2-hydroperoxy-4-hydroxy-2-methyl heptane, 3-ethyl-3-hydroperoxy-5-hydroxy hexane, cumyl hydroperoxide (2-phenyl-2-hydroperoxy propane), m- and p-isopropylcumyl hydroperoxide, m- and p-(tert-butylperoxy isopropyl)cumyl hydroperoxide, 1-hydroperoxy-1-methyl cyclohexane, 1-hydroperoxy-5-hydroxy-1,3,3-trimethyl cyclohexane, p-menthane hydroperoxide, and pinane hydroperoxide. According to the present invention, use may also be made of mixtures of hydroperoxides as stabilizing agents. The most preferred organic hydroperoxides for the present invention are TBHP, TAHP, and TMBH.

Examples of ethylenically unsaturated organic compounds that preferably cannot homopolymerize for use in the present invention are selected from the group consisting of dialkyl maleates, dialkyl fumarates, α-olefins, styrene, α-methylstyrene, α-unsaturated ketones represented by formula (IV):

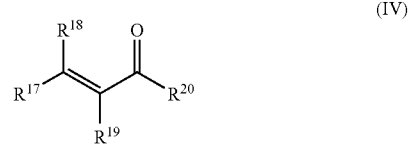

wherein $R^{17}$ can be selected from hydrogen, alkyl, alkenyl, and aryl, $R^{18}$ can be selected from hydrogen, alkyl, and aryl, $R^{19}$ can be selected from hydrogen and alkyl, $R^{20}$ can be selected from hydrogen, OH, and $OR^{21}$, and $R^{21}$ can be selected from alkyl and aryl, or $R^{17}$ and $R^{19}$ can form a cycloalkenyl or oxa-cycloalkenyl moiety, and compounds represented by formula (V):

wherein $R^{22}$ and $R^{23}$ are the same or different and are selected from the group consisting of hydrogen, alkyl of 1 to 4 carbons, cycloalkyl of 5 to 10 carbons, aryl of 6 to 10 carbons, aralkyl of 7 to 11 carbons, alkenyl of 2 to 6 carbons, bromo and chloro; and wherein Z is —C≡N or —C≡C—$R^{24}$, wherein $R^{24}$ is selected from the group consisting of hydrogen, alkyl of 1 to 4 carbons, cycloalkyl of 5 to 10 carbons, alkenyl of 2 to 6 carbons, aralkyl of 7 to 11 carbons, and aryl of 6 to 10 carbons. Preferred compounds are dibutyl maleates Examples of compounds with labile carbon-hydrogen bonds that are suitable for use in the present invention are selected from the group consisting of β-dicarbonyl compounds and cyclic α-diketone compounds, including diethyl malonate and acetyl acetone, as mentioned in EP-0,810,213-A2, aliphatic aldehydes, and aromatic aldehydes. Preferred are diethyl malonate and acetyl acetone Examples of oximes that are suitable for use in the present invention are selected from the group consisting of compounds represented by formula (VI):

(VI)

wherein $R^{25}$ and $R^{26}$ are independently selected from the group consisting of hydrogen, branched or unbranched, substituted or unsubstituted alkyl containing 1 to 22 carbon atoms or alkenyl containing 2 to 22 carbon atoms, unsubstituted or substituted phenyl, or $R^{25}$ and $R^{26}$ taken together with the carbon atom to which they are attached can form a substituted or unsubstituted cycloalkyl ring containing 4 to 8 carbon atoms; or $R^{25}$ can be —C($R^{27}$)=N—OH wherein $R^{27}$ can be hydrogen, branched or unbranched, substituted or unsubstituted alkyl containing 1 to 22 carbon atoms or alkenyl containing 2 to 22 carbon atoms, unsubstituted or substituted phenyl, or $R^{27}$ taken together with $R^{26}$ and the carbon atom to which $R^{26}$ is attached can form a substituted or unsubstituted cycloalkyl ring containing 4 to 8 carbon atoms.

Preferred controlling agents for use in the present invention are hydroperoxides and ethylenically unsaturated organic compounds that preferably cannot homopolymerize. More preferred controlling agents are hydroperoxides and dibutyl maleate. The most preferred controlling agents are hydroperoxides.

The (effective) amount of controlling agent to be used in the process of the present invention is dependent on the type of controlling agent and the type of organic peroxide used. Typically, the amount of controlling agent used is 0.3-45 wt %, based on the weight of organic peroxide. When a hydroperoxide is used as controlling agent, the amount preferably is 0.3-3 wt %, more preferably 0.5-1.5 wt %, and most preferably 0.7-1.5 wt %. When an ethylenically unsaturated compound such as dibutyl maleate is used as the controlling agent, the amount preferably is 4-45 wt %, more preferably 5 to 25 wt %, and most preferably 8-15 wt %, based on the weight of the organic peroxide. For control of a process in which diisobutyryl peroxide is used and wherein the controlling agent is TBHP, the amount of TBHP used typically is in the range of 0.3-2 wt %, based on the amount of diisobutyryl peroxide, whereas for control of a process in which diisobutyryl peroxide is used and wherein the controlling agent is dibutyl maleate, the amount of dibutyl maleate used typically is 5-20 wt %, based on the amount of diisobutyryl peroxide.

In order to control the polymerization process, all or part of the controlling agent can be dosed to the reactants forming the polymerization reaction mixture. The controlling agent may be added to the polymerization reaction mixture separately or in admixture with one of the other compounds, such as in admixture with the one or more organic peroxides. In a preferred embodiment of the present invention, the controlling agent is admixed with the one or more organic peroxides to be used in the polymerization reaction selected from the group consisting of diacyl peroxides, peroxyesters, peroxydicarbonates, and mixtures thereof, prior to use thereof in said reaction. This admixing results in a formulation comprising organic peroxide and controlling agent. The formulation can be a solution of organic peroxide and/or controlling agent or it can be a suspension or emulsion of organic peroxide and/or controlling agent. Such a formulation has several advantages, such as improved stability of the peroxide formulation, as is described in U.S. Pat. No. 5,155,192. More specifically, in order to comply with the rules relating to storage and/or transportation of organic peroxide compositions, such formulations must be stored and transported at 20° C. below the self-accelerating decomposition temperature (SADT) of the organic peroxide. The SADT is an internationally accepted parameter from which the maximum temperature at which goods are allowed to be transported can be derived. For practical and economical reasons the maximum storage temperature should not be below approximately −20° C., meaning that the SADT should be at least 0° C. This often implies a limitation with regard to the concentration of the peroxide formulation. The addition of a stabilizing controlling agent to the organic peroxide composition generally results in a significant increase in the SADT of the stabilized organic peroxide composition. Consequently, the concentration of the organic peroxide can be increased to some extent (which lowers the SADT), or the transport temperature can be increased, which leads to reduced organic peroxide transport costs.

In addition to its controlling effect on the polymerization process, said controlling agent can also have a positive effect on the uncontrolled thermal decomposition behaviour of the organic peroxide. In order to test the influence of the controlling agent on the stability of an organic peroxide, a so-called mini-HAST test is performed. In a mini-HAST test as meant in this specification, typically a Dewar vessel with a volume of 100 ml is charged with 50 g of a sample comprising the organic peroxide to be tested, optionally in the presence of one or more controlling agents. Next, a Temperature v. Time profile of the sample is measured in order to determine the stabilizing effect of the respective controlling agent used. A blank sample, i.e. a sample with no controlling agent present, is also analyzed to serve as a point of reference.

The Organic Peroxides

Preferred organic peroxides that are particularly suitable for the process of the present invention are selected from the group of consisting of:

diacyl peroxides of formula (I)

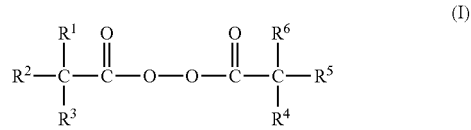

(I)

wherein $R^1$-$R^6$ are independently selected from the group consisting of hydrogen, halogens, alkoxy groups, and saturated or unsaturated, linear or branched, substituted or unsubstituted alkyl, alkaryl, and aralkyl moieties, and wherein two of $R^1$-$R^3$ of $R^1C(R^2)R^3$ and/or two of $R^4$-$R^6$ of $R^4C(R^5)R^6$ can be linked to form a cyclic structure which can be saturated or unsaturated and optionally may be substituted with one or more independently chosen groups $R^{28}$, which $R^{28}$ is selected from the group consisting of hydrogen, halogens, alkoxy groups, and saturated or unsaturated, linear or branched, substituted or unsubstituted alkyl, alkaryl and aralkyl moieties, with the proviso that at most one of $R^1C(R^2)R^3$ and $R^4C(R^5)R^6$ is $CH_3$, peroxyesters of formula (II)

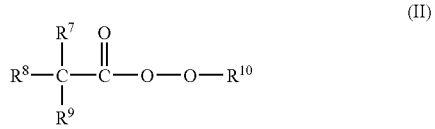

(II)

wherein $R^7$-$R^9$ are independently selected from the group consisting of hydrogen, halogens, alkoxy groups, and saturated or unsaturated, linear or branched, substituted or unsubstituted alkyl, alkaryl, and aralkyl moieties, with the proviso that $R^7C(R^8)R^9$ is not $CH_3$, wherein two of $R^7$-$R^9$ can be linked to form a cyclic structure which can be saturated or unsaturated and optionally may be substituted with one or more independently chosen groups $R^{29}$, which $R^{29}$ is selected from the group consisting of hydrogen, halogens, alkoxy groups, and saturated or unsaturated, linear or branched, substituted or unsubstituted alkyl, alkaryl, and aralkyl moieties, and wherein $R^{10}$ is selected from the group consisting of saturated or unsaturated, substituted or unsubstituted, linear or branched alkyl, alkaryl, and aralkyl moieties, peroxydicarbonates having a solubility in water at 0° C. of at least 5 ppm of formula (III):

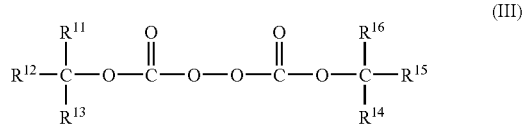

(III)

wherein $R^{11}$-$R^{16}$ are independently selected from the group consisting of hydrogen, halogens, and saturated or unsaturated, linear or branched, substituted or unsubstituted alkyl, alkaryl, and aralkyl moieties, and wherein two of $R^{11}$-$R^{13}$ of $R^{11}C(R^{12})R^{13}$ and/or two of $R^{14}$-$R^{16}$ can be linked to form a cyclic structure which can be saturated or unsaturated and optionally may be substituted with one or more independently chosen groups $R^{30}$, which $R^{30}$ is selected from the group consisting of hydrogen, halogens, alkoxy groups, and saturated or unsaturated, linear or branched, substituted or unsubstituted alkyl, alkaryl, and aralkyl moieties, and mixtures of diacyl peroxide(s) of formula (I), peroxyester(s) of formula (II), and/or peroxydicarbonate(s) of formula (III).

More preferred peroxydicarbonate(s) of formula (III) above and mixtures thereof with peroxyester(s) of formula (II) and/or diacylperoxide(s) of formula (I) are those wherein $R^{11}$-$R^{16}$ are independently selected from the group consisting of hydrogen, halogens, and saturated or unsaturated alkyl moieties wherein the number of carbon atoms is at most 4, and wherein two of $R^{11}$-$R^{13}$ of $R^{11}C(R^{12})R^{13}$ and/or two of $R^{14}$-$R^{16}$ can be linked to form a cyclic structure which can be saturated or unsaturated and optionally may be substituted with one or more independently chosen groups $R^{30}$, which $R^{30}$ is selected from the group consisting of hydrogen, halogens, alkoxy groups, and saturated or unsaturated, linear or branched, substituted or unsubstituted alkyl, alkaryl, and aralkyl moieties.

If a mixture of organic peroxides is used, it is preferred to select one or more organic peroxides from the group of diacyl peroxides or the group of peroxy-esters or the group of peroxydicarbonates, although it is also possible to select one or more organic peroxides from at least two of these groups of diacyl peroxides, peroxyesters, and peroxydicarbonates.

If the selection is made from the group of diacyl peroxides, particularly preferred diacyl peroxides for use in the process of the present invention are selected from the group wherein $R^1$-$R^6$ are independently selected from the group consisting of hydrogen, alkoxy groups, and saturated or unsaturated, linear or branched alkyl, alkaryl, and aralkyl moieties, with the proviso that at most one of $R^1C(R^2)R^3$ and $R^4C(R^5)R^6$ is $CH_3$. More preferred are diacyl peroxides wherein $R^1$—$R^6$ are independently selected from the group consisting of linear or branched alkyl moieties. Although $R^1$-$R^6$ may all be independently selected, it is preferred to use a symmetric diacyl peroxide. Most preferred is the use of just one diacyl peroxide, although it is also possible to use a mixture of diacyl peroxides. The most preferred diacyl peroxide for use in the process of the present invention is diisobutyryl peroxide, wherein $R^1$ and $R^4$ are hydrogen and $R^2$, $R^3$, $R^5$, and $R^6$ are methyl.

If the selection is made from the group of peroxyesters, particularly preferred peroxyesters for use in the process of the present invention are selected from the group wherein $R^7$-$R^9$ are independently selected from the group consisting of hydrogen, alkoxy groups, and saturated or unsaturated, linear or branched alkyl, alkaryl, and aralkyl moieties, with the proviso that $R^7C(R^8)R^9$ is not $CH_3$, and wherein $R^{10}$ is selected from the group consisting of saturated or unsaturated, substituted or unsubstituted, linear or branched alkyl moieties. More preferred are peroxyesters wherein $R^7$-$R^9$ are independently selected from the group consisting of linear or branched alkyl and alkoxy moieties and wherein $R^{10}$ is tert-butyl, tert-amyl, tert-octyl, or 1,1-dimethyl-3-hydroxy-butyl. Most preferred is the use of just one peroxyester, although it is also possible to use a mixture of peroxyesters. The most preferred peroxyester for use in the process of the present invention is tert-amyl peroxy methoxy acetate.

If the selection is made from the group of peroxydicarbonates having a solubility in water at 0° C. of at least 5 ppm, particularly preferred peroxydicarbonates for use in the process of the present invention are selected from the group wherein $R^{11}$-$R^{16}$ are independently selected from the group consisting of hydrogen, and saturated or unsaturated, linear or branched alkyl moieties. Although $R^{11}C(R^{12})R^{13}$ and $R^{14}C(R^{15})R^{16}$ are preferably identical, the invention is not limited to these symmetrical peroxydicarbonates. Most preferred is the use of just one peroxydicarbonate, although it is also possible to use a mixture of peroxydicarbonates. The most preferred peroxydicarbonates are di-sec-butyl peroxydicarbonate and diethyl peroxydicarbonate.

Although a great many combinations of one or more organic peroxides with one or more controlling agents are possible, for a very effective reduction of fish eye levels in (co)polymers one or more organic peroxides selected from the group consisting of peroxyesters, diacyl peroxides, and mixtures thereof with one or more hydroperoxides or dibutyl maleate is preferred. One or more organic peroxides selected from the group consisting of peroxyesters, diacyl peroxides, and mixtures thereof with one or more hydroperoxides are more preferred. For an even more effective reduction of fish eye levels in (co)polymers, a combination of a diacyl peroxide with a hydroperoxide is particularly preferred. Fish eye levels in (co)polymers are most effectively reduced if diisobutyryl peroxide is used as organic peroxide in combination with TBHP as controlling agent.

Because of their relatively high half-life period at the process temperature, many conventional initiators require long reaction times, which is undesirable for certain polymerization processes, for example continuous dosing (CD) polymerization processes, as further explained below. The term "half-life" relates to the time required for decomposition of 50% of the original amount of compound at a given temperature. The disadvantage of long reaction times cannot be eliminated satisfactorily by increasing the concentration, since this typically results in unreacted initiator ending up in the final (co)polymer. A way to overcome this problem is to use so-called "extremely fast initiators", such as diacyl peroxides of formula (I), peroxyesters of formula (II), and peroxydicarbonates of formula (III). The extremely fast initiators are characterized by very short half-life periods at the polymerization temperature. The preferred half-life of the organic peroxide used in the present invention is at least 0.0001 hour and at most 1.0 hour at the polymerization temperature. More preferably, the half-life is at most 0.8 hours, even more preferably the half-life is at most 0.5 hours, and most preferably the half-life of the organic peroxide is at most 0.3 hours at the polymerization temperature. Particularly suitable, especially for CD polymerization processes, are organic peroxides having a half-life of 0.01-0.2 hours at the polymerization temperature.

In a preferred embodiment of the present invention, the organic peroxide (initiator) is dosed to a reactor during the polymerization process. Dosing of an extremely fast initiator to a polymerization reaction allows improved control of the polymerization rate, higher polymerization rates leading to an increased space-time yield of polymerization reactors, and results in the process leading to a polymer with very low residual initiator levels. It is to be understood that the word "dosing" is used to describe the step of adding organic peroxide to the polymerization reaction mixture at polymerization conditions. The dosing can be done intermittently during the polymerization over a period of time wherein at least 20%, preferably at least 40%, even more preferably at least 60% of all monomer used in the process is polymerized, meaning that at least two portions of initiator are added to the reaction mixture. Alternatively, the addition can be continuous (i.e. a continuous dosing polymerization process), meaning that for a certain period of time the initiator is continuously added to the reaction mixture. Combinations of these techniques are also possible. An example of a combination of such techniques includes, for instance, a process wherein the initiator is first added continuously, then the addition is stopped, and then it is added continuously again. If an intermittent operation is selected, there are at least 2, preferably at least 4, more preferably at least 10, and most preferably at least 20 moments at the polymerization temperature at which the initiator is dosed. Most preferably, the organic peroxide is dosed continuously and/or intermittently from the start of the polymerization reaction, preferably after at least 5%, more preferably at least 10%, even more preferably at least 20%, most preferably at least 30% of the monomer(s) has already been polymerized and wherein during the dosing period at least 2%, preferably at least 5%, more preferably at least 10%, even more preferably at least 20%, even more preferably still at least 30%, and most preferably at least 50% of all monomer(s) used in the process is polymerized. It is also possible to add up to 90 wt % of said organic peroxide (or mixture of organic peroxides), based on the total amount of organic peroxide(s) used in the polymerization process, at the start of the polymerization. Preferably, at most 80 wt % of said maximum amount is added at the start of the polymerization, more preferably at most 70 wt %, and most preferably at most 65 wt %. As in a preferred embodiment the controlling agent is added to the reaction mixture in admixture with the one or more organic peroxides it is added to the reaction mixture in the same preferred way as the organic peroxide. If, however, the controlling agent is added to the reaction mixture separately, it also is preferably added to the polymerization reaction mixture as indicated above for the one or more organic peroxides.

The initiator used in the polymerization reaction serves as a source of free radicals. The formation of a free radical is followed by the radical's reaction with a monomer, which is the actual initiation of the polymerization. It will be obvious that for efficient progress of the polymerization reaction, it is important to have good interaction of the initiator with the monomer during the polymerization reaction. This particularly is an issue for aqueous dispersion processes such as suspension or emulsion polymerization processes, wherein the reaction mixture typically is a suspension or (micro-) emulsion of monomer in water, since in these processes an aqueous and a non-aqueous phase are present. It is noted that for the present process the solubility of the organic peroxide (the initiator) in water should be relatively low. If the solubility of the organic peroxide in the aqueous phase is too high, the result is that there is no, or only very minor, interaction of the organic peroxide with the monomer phase. On the other hand, the solubility should not be too low either, since in that case the redistribution of the organic peroxide may take too much time, as a result of which the effect of the controlling agent is negligible. Preferably, the organic peroxide used as initiator for the present polymerization process has a solubility in water of 5-10,000 ppm at 0° C., more preferably the solubility in water is 15-1,500 ppm at 0° C., and most preferably the solubility in water is 20-1,000 ppm at 0° C.

The amount of organic peroxide to be used as initiator in the polymerization process of this invention is within the range used in conventional polymerization processes. Typically, from 0.005-2 wt % of initiator, preferably 0.01-1 wt %, more preferably 0.01-0.5 wt %, based on the weight of ethylenically unsaturated monomer(s) (vide infra) to be polymerized, is used. It is noted that the organic peroxide used as initiator may be used in combination with other (conventional) initiators.

In a preferred embodiment of the present invention, the organic peroxide(s) is/are liquid or in solution at the polymerization temperature. The term "solution" here means a homogeneous mixture of the organic peroxide(s) in an (organic) solvent. One or more suitable solvents can be used to dissolve and dilute the initiator. Preferably, such solvents are easily removed during the steps in which the polymer is worked up after the polymerization process, as is the case for alcohols, or they are of such a nature that it is acceptable to leave them as a residue in the final polymer, as is the case for solvents that are desired plasticizers for the final polymer material. Furthermore, it can be advantageous, but is not necessarily required, that such solvents do not adversely affect the thermal stability of the initiator dissolved therein, as can be verified by analyzing the half-life temperature of the initiator in said solvent and without said solvent. An example of such a solvent is isododecane. In another preferred embodiment of the present invention, the organic peroxide is dosed to the polymerization process as an organic peroxide dispersion, preferably an aqueous organic peroxide dispersion.

Preferred embodiments of the formulations according to the present invention are formulations of the one or more organic peroxides and the controlling agent in an (organic) solvent, wherein the solvent is a solvent as further specified in the paragraph above.

It is noted that when the term "polymerization temperature" is used, this is the temperature at which the majority of all monomer (i.e. more than 50 wt %, preferably more than 60 wt %, most preferably more than 75 wt % of the monomer to be polymerized) is polymerized. It is known that the polymerization temperature set-point can be varied over time. Known temperature variations for polymerizations of vinyl chloride include an intentionally higher temperature when the polymerization is started and/or a higher temperature upon pressure drop, both used to increase the reactor output. If a variation in the polymerization temperature is applied, then the polymerization temperature is considered to be the average temperature over time. It is noted that also in the process of the present invention, the polymerization temperature set-point during the start-up and pressure drop stages may be higher than the average polymerization temperature set-point.

The process of the present invention is pre-eminently suited for the (co)polymerization of one or more ethylenically unsaturated monomers, such as (meth)acrylic acid (esters), styrene, vinyl acetate, acrylonitrile, vinyl chloride monomer (VCM), and the like. Preferably, the process according to the invention involves the polymerization of monomer mixtures comprising at least 50 wt % of VCM, based on the weight of all monomer(s). In this preferred process, preferred comonomers for use are of the conventional type and include vinylidene chloride, vinyl acetate, ethylene, propylene, acrylonitrile, styrene, and (meth)acrylates. More preferably, at least 80 wt % of the monomer(s) being polymerized is made up of VCM, while in the most preferred process the monomer consists essentially of VCM. As is known in the art, the polymerization temperature of such processes largely determines the molecular weight of the final polymer.

The polymerization process can be conducted as a mass process wherein the reaction mixture is predominantly monomer, as a suspension process wherein the reaction mixture typically is a suspension of monomer in water, or as an emulsion or micro-emulsion process wherein the monomer typically is emulsified in water. In the suspension or emulsion process of the invention, the usual additives may have to be used, such as surfactant(s), protective colloid(s), anti-fouling agent(s), pH-buffer(s), and the like.

The polymerization process of the invention is preferably conducted at a temperature in the range of 30-80° C., more preferably in the range of 40-70° C. For these temperature ranges an organic peroxide is selected that has a half-life of at most 0.8 hours at the process temperature. The polymerization reaction time can vary from about 0.5 to about 15 hours, and is preferably from 0.8-10 hours.

A reduced level of fish eyes according to this invention means that in comparison with the exact same polymerization without the controlling agent, the number of fish eyes is reduced by at least 15%, preferably at least 20%, more preferably at least 25%, most preferably at least 30%.

In absolute terms a reduced level of fish eyes preferably means a level below 120 fish eyes/10 dm$^2$, more preferably the level is below 100 fish eyes/10 dm$^2$, even more preferably below 70 fish eyes/10 dm$^2$, still more preferably below 50 fish eyes/10 dm$^2$, most preferably below 40 fish eyes/10 dm$^2$.

Fish eye level is determined using a method based on the method as described in O. Leuchs-Kunststoffe 50(4) 1960, 227-234. In short, using a two roll-mill Agila, PVC sheets of a thickness between 0.18 and 0.22 mm are prepared at a temperature of 150+/−2° C. Firstly the rolls of the roll-mill are adjusted to a friction of 1:1.2 and the PVC compound is within 10 seconds transferred to the roll-mill. After 1 minute the roll distance is adjusted to 1.1 mm and mixing is continued for 7 minutes. After 8 minutes the compound is taken of the roll-mill as a 1-1.2 mm thick sheet and cooled. Subsequently the roll-mill is stopped and the roll distance is adjusted to give a sheet of 0.2 mm (for the Agila mill: 0.3 and 0.4 mm) whereafter the amount of fish eyes is counted on a 100×100 mm square of the resulting sheet.

In a preferred embodiment of the present invention, a significantly reduced level of fish eyes is observed if the polymerization process is started with a "hot start". By "hot start" is meant here that the peroxide is dosed at or close to the polymerization temperature. A significantly reduced level of fish eyes means that in comparison with the exact same polymerization without the controlling agent, the number of fish eyes is reduced by at least 10, preferably at least 20, more preferably at least 50 per 10 dm$^2$.

EXAMPLES

The invention is further elucidated by the following examples.

Examples 1-6 & Comparative Examples A-C

Materials:

| | |
|---|---|
| Tx 187-W27.5 | Diisobutyryl peroxide (emulsion of 27.5 wt % of diisobutyryl peroxide in water) ex Akzo Nobel |
| Tx 187-C50 | Diisobutyryl peroxide (solution of 50 wt % of diisobutyryl peroxide in odourless mineral spirit) ex Akzo Nobel |
| H$_2$O$_2$ | Commercially available aqueous hydrogen peroxide with an assay of 70% was used |
| TMBH | 1,1,3,3-tetrabutyl hydroperoxide ex Akzo Nobel (90% pure) |
| TBHP | tert-butyl hydroperoxide ex Akzo Nobel (80% in organic solvent mixture) |
| DTBM | di(tert-butyl) maleate ex Degussa-Huels (100%) |

Experimental Part:

For mini-HAST tests of diisobutyryl peroxide, 50 ml samples are weighed into 100 ml Dewar vessels. The Dewar vessel is put into a test chamber (freezer or oven) that is kept at a constant temperature of 10° C. The temperature profile of the sample in the Dewar vessel is recorded: The test is continued until the temperature of the sample exceeds 30° C. (a runaway may occur). The recorded temperature profile for Tx187-W27.5 emulsions in water is shown in FIG. 1. The time it takes for the sample to warm from 10° C. to 30° C. and the corresponding relative stabilization are presented in Table 1.

TABLE 1

| Example | Sample[1] | Time 10° C. > 30° C. (minutes) | Relative stabilization[2] (%) Low | Relative stabilization[2] (%) High |
|---|---|---|---|---|
| A | Tx 187-W27.5 | 324 | — | — |
| B | Tx 187-W27.5 + 2 wt % $H_2O_2$ | 356 | 10 | |
| 1 | Tx 187-W27.5 + 1 wt % TBHP | 563 | | 74 |
| 2 | Tx 187-W27.5 + 3 wt % TBHP | 637 | | 97 |
| 3 | Tx 187-W27.5 + 1 wt % TMBH | 589 | | 82 |
| 4 | Tx 187-W27.5 + 2 wt % TBHP + 1 wt % TMBH | 635 | | 96 |
| C | Tx 187-C50 | 173 | — | — |
| 5 | Tx 187-C50 + 1 wt % TBHP | 371 | | 114 |
| 6 | Tx 187-C50 + 10 wt % DTBM | 344 | | 99 |

[1] Amount of $H_2O_2$, DTBM, TBHP, and/or TMBH as pure in wt %, based on the amount of Tx 187-W27.5 or Tx 187-C50
[2] Relative stabilization based on the amount of time that "unstabilized" Tx 187-W27.5 or Tx 187-C50 needs to heat from 10° C. to 30° C. (Comparative Examples A and C, respectively)

Examples 7-10 & Comparative Examples D-G

Materials:

| | |
|---|---|
| VCM | vinyl chloride monomer ex Akzo Nobel |
| Tx 187-W35 | diisobutyryl peroxide (Emulsion of 35.8 wt % of diisobutyryl peroxide in water) ex Akzo Nobel |
| Tx EHP | di(2-ethylhexyl) peroxydicarbonate ex Akzo Nobel (97%) |
| IBDP | isobutanoyl dodecanoyl peroxide (97% pure, prepared on a small scale) |
| TMBH | 1,1,3,3-tetrabutyl hydroperoxide ex Akzo Nobel (90%) |
| TBHP | tert-butyl hydroperoxide ex Akzo Nobel (80%) |
| DTBM | di(tert-butyl) maleate ex Degussa-Huels (100%) |

Experimental Part (General):

All the experiments are carried out according to a standard suspension polymerization process, using a 10 l Büchi reactor equipped with a baffle, three flat-bladed stirrers at three levels, a pressure transducer, a vinyl chloride (VCM) feed line, a nitrogen purge line, a peroxide feed line, and a peroxide injection point. The reactor is charged with 4,700 g of demineralized water and 40.2 g of a 5% (w/w) solution of Alcotex® B72 (polyvinylacetate/alcohol) in demineralized water, and pressurized with nitrogen to 15 bar. If no leaks are observed, the reactor is depressurized for 5 minutes at 75 mbar (while stirred) to remove the air and nitrogen. Subsequently, the reactor is charged with 2,870 g of VCM, followed by heating of the reactor to the desired polymerization temperature of 57° C. in 30-60 minutes. After reaching a stable temperature, a peroxide initiator is dosed continuously or stepwise, either via the peroxide injecting point within 1 minute after reaching the polymerization temperature, or through the peroxide feed line during the polymerization process, or by a combination of the two possibilities, whichever is required.

Dosing of the organic peroxide through the feed line is done in such a way that the maximum rate (33%/h) is reached in 0.5-0.65 hours. The cooling capacity is limited to a value corresponding to a maximum polymerization rate of about 33%/h (maximum of the reference experiment). The polymerization is stopped when a pressure drop of 2 bar is observed, by cooling the reactor and degassing it. After removal of the residual VCM by evacuation, the polymer is obtained by filtration, washing, and drying. If an aqueous dispersion of a peroxide initiator is also dosed during the polymerization process, the intended volume of aqueous dispersion to be dosed has already been subtracted from the amount of demineralized water added to the reactor at the beginning of the polymerization process. This will ensure that the total amount of water present in the polymerization reaction mixture at the end of the process is approximately equal in all cases. After completion of the polymerization process, the amount of fish eyes/10 dm$^2$ is determined.

Using the general experimental set-up as described above, in Examples D, 7-10 Tx 187-W35 peroxide (solubility of diisobutyryl peroxide in water at 0° C.: 35 ppm, half life: 0.1 hr at the polymerization temperature of 57° C.) was used in the amounts indicated in Table 2. The Tx 187-W35 was continuously dosed in all Examples D, 7-10.

In Comparative example D, no controlling agent was used. In Examples 7 and 10, TBHP was used as controlling agent, with all TBHP being added to the reaction mixture prior to the addition of Tx 187-W35 in Example 10, whereas in Example 7 the TBHP controlling agent was added to the peroxide formulation. In Example 8, TBHP and TMBH were used as controlling agents added to the peroxide formulation. Finally, in Example 9, DTBM was used as the controlling agent which was added to the peroxide formulation.

In Comparative Examples E and F, Tx EHP (solubility of di(2-ethylhexyl) peroxy-dicarbonate in water at 0° C.: <1 ppm, half life: 2.4 hr at the polymerization temperature of 57° C.) was used as organic peroxide, which was added in a single shot at the beginning of the polymerization reaction at the polymerization temperature. In Comparative Example E no controlling agent was used, whereas in Comparative Example F, TBHP was used as the controlling agent which was added to the reaction mixture simultaneously with the Tx EHP.

In Comparative Example G, IBDP (solubility of isobutanoyl dodecanoyl peroxide in water at 0° C. is 2 ppm, half life is 0.4 hr at the polymerization temperature of 57° C.) was used as the organic peroxide which was added continuously at the polymerization reaction. No controlling agent was used.

The results of the experiments are presented in Table 2.

TABLE 2

| | Organic peroxide | | Controlling agent | | Fish eyes/ 10 dm$^2$ |
|---|---|---|---|---|---|
| Example | Type | Quantity[1] | Type | Quantity[2] | |
| D | Tx 187-W35 | 905 ppm | — | — | 145 |
| E | Tx EHP | 550 ppm | — | — | 895 |
| F | Tx EHP | 550 ppm | TBHP | 5 ppm | 1975 |
| G | IBDP | 2650 ppm | — | — | >2000 |
| 7 | Tx 187-W35 | 955 ppm | TBHP | 9.5 ppm | 8 |
| 8 | Tx 187-W35 | 1007 ppm | TMBH + TBHP | 20 ppm + 5 ppm | 20 |
| 9 | Tx 187-W35 | 895 ppm | DTBM | 90 ppm | 30 |
| 10 | Tx 187-W35 | 990 ppm | TBHP | 10 ppm | 20 |

[1] Amount of organic peroxide (Tx 187-W35 in Examples 7-10 and Comparative Example D; Tx EHP in Comparative Examples E-F, IBDP in Comparative Example G), based on the amount of VCM
[2] Amount of controlling agent, based on the amount of VCM From the results presented in Table 2 it follows that the use of an organic peroxide, in conjunction with an effective amount of a controlling agent according to the invention, provides a final polymer material with a reduced level of fish eyes. This is not the case when the controlling agent is added to an organic peroxide which is not covered by the present invention (see Comparative Example F).

Solubility of Organic Peroxide at 0° C.

The solubility of the organic peroxide is determined by mixing equal volumes of water (deuteriated) and deuteriated tetrachloroethane containing 5% (w/w) of the organic peroxide for 10 minutes at 0° C. (Table 3). After phase separation, the quantity of peroxide in the water phase is determined by $^1$H-NMR.

TABLE 3

| Organic peroxide | Solubility in water 0° C. |
|---|---|
| Di(2-ethylhexyl) peroxydicarbonate (Tx EHP) | <1 ppm |
| Isobutanoyl dodecanoyl peroxide (IBDP) | 2 ppm |
| Diisobutyryl peroxide (Trigonox 187) | 35 ppm |

The invention claimed is:

1. Polymerization process for preparing a (co)polymer wherein one or more organic peroxides selected from the group consisting of diacyl peroxides, peroxyesters, peroxydicarbonates, and mixtures thereof are used in conjunction with an effective amount of one or more controlling agents selected from the group consisting of organic hydroperoxides, ethylenically unsaturated organic compounds that cannot homopolymerize, compounds with labile carbon-hydrogen bonds, oximes, and mixtures thereof, with the proviso that the solubility of the peroxydicarbonate(s) in water at 0° C. is at least 5 ppm, and wherein the process is an aqueous dispersion polymerization process wherein at least part of the one or more organic peroxides used as initiator is dosed to the reaction mixture at the polymerization temperature.

2. A polymerization process according to claim 1 wherein the one or more organic peroxides are selected from the group of diacyl peroxides, peroxyesters, and mixtures thereof.

3. A polymerization process according to claim 2 wherein the one or more organic peroxides have a solubility in water at 0° C. of at least 5 ppm.

4. A polymerization process according to claim 1 wherein the one or more organic peroxides are selected from the group consisting of organic peroxides having a half-life of at least 0.0001 hour and at most 1.0 hour at the polymerization temperature and mixtures thereof.

5. A process according to claim 1 wherein the organic peroxide used as initiator is dosed continuously and/or intermittently to the reaction mixture.

6. A process according to claim 1 wherein the controlling agent is an organic hydroperoxide or an ethylenically unsaturated organic compound that cannot homopolymerize.

7. A process according to claim 1 wherein the controlling agent is an organic hydroperoxide or a mixture of organic hydroperoxides, said organic hydroperoxide having the general formula ROOH, wherein R represents an organic group, more particularly R represents a branched or non-branched, substituted or unsubstituted alkyl group, alkenyl group, alkynyl group or cycloalkyl group.

8. A process according to claim 1 wherein the diacyl peroxides, peroxyesters, and/or peroxydicarbonates are selected from the group consisting of:

diacyl peroxides of formula (I)

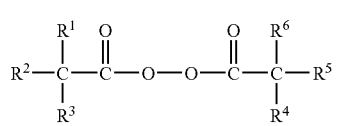

wherein $R^1$-$R^6$ are independently selected from the group consisting of hydrogen, halogens, alkoxy groups, and saturated or unsaturated, linear or branched, substituted or unsubstituted alkyl, alkaryl, and aralkyl moieties, and wherein two of $R^1$-$R^3$ of $R^1C(R^2)R^3$ and/or two of $R^4$-$R^6$ of $R^4C(R^5)R^6$ can be linked to form a cyclic structure which can be saturated or unsaturated and optionally may be substituted with one or more independently chosen groups $R^{28}$, which $R^{28}$ is selected from the group consisting of hydrogen, halogens, alkoxy groups, and saturated or unsaturated, linear or branched, substituted or unsubstituted alkyl, alkaryl, and aralkyl moieties, with the proviso that at most one of $R^1C(R^2)R^3$ and $R^4C(R^5)R^6$ is $CH_3$, peroxyesters of formula (II)

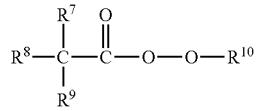

wherein $R^7$-$R^9$ are independently selected from the group consisting of hydrogen, halogens, alkoxy groups, and saturated or unsaturated, linear or branched, substituted or unsubstituted alkyl, alkaryl, and aralkyl moieties, with the proviso that $R^7C(R^8)R^9$ is not $CH_3$, wherein two of $R^7$—$R^9$ can be linked to form a cyclic structure which can be saturated or unsaturated and optionally may be substituted with one or more independently chosen groups $R^{29}$, which $R^{29}$ is selected from the group consisting of hydrogen, halogens, alkoxy groups, and saturated or unsaturated, linear or branched, substituted or unsubstituted alkyl, alkaryl, and aralkyl moieties, and wherein $R^{10}$ is selected from the group consisting of saturated or unsaturated, substituted or unsubstituted, linear or branched alkyl, alkaryl, and aralkyl moieties, and peroxydicarbonates of formula (III)

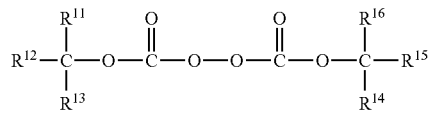

wherein $R^{11}$-$R^{16}$ are independently selected from the group consisting of hydrogen, halogens, and saturated or unsaturated alkyl moieties wherein the number of carbon atoms is at most 4, and wherein two of $R^{11}$-$R^{13}$ of $R^{11}C(R^{12})R^{13}$ and/or two of $R^{14}$-$R^{16}$ can be linked to form a cyclic structure which can be saturated or unsaturated and optionally may be substituted with one or more independently chosen groups $R^{30}$, which $R^{30}$ is selected from the group consisting of hydrogen, halogens, alkoxy groups, and saturated or unsaturated, linear or branched, substituted or unsubstituted alkyl, alkaryl, and aralkyl moieties.

9. A process according to claim 1 wherein the organic peroxide is diisobutyryl peroxide and the controlling agent is tert-butyl hydroperoxide.

10. A process according to claim 1 wherein the controlling agent is dosed to the polymerization process in the form of a composition further comprising one or more organic peroxides selected from the group consisting of diacyl peroxides, peroxyesters, peroxydicarbonates, and mixtures thereof.

11. A process according to claim 4 wherein the organic peroxide has a half-life of at most 0.8 hours at the polymerization temperature.

12. Formulation suitable for use in an aqueous dispersion polymerization process of claim 8, said formulation comprising one or more organic peroxides selected from the group consisting of diacyl peroxides of formula I and an effective amount of dibutyl maleate as controlling agent.

13. Formulation suitable for use in an aqueous dispersion polymerization process of claim 8, said formulation comprising one or more organic peroxides selected from the group of diacyl peroxides of formula I as described above, peroxyesters of formula II as described above, and mixtures thereof, and an effective amount of an organic hydroperoxide as controlling agent, said formulation not being a formulation comprising a peroxide of the formula R—O—C(O)—O—O—C(O)—O—R' wherein R and R' are independently selected from branched or non-branched, substituted or unsubstituted, alkyl, alkenyl or cycloalkyl $C_1$-$C_{20}$ hydrocarbon moieties and a phlegmatizing agent according to the formula R"HC=CHR'", wherein R" and R'" are independently selected from hydrogen and the group consisting of linear or branched, substituted or unsubstituted, saturated or unsaturated $C_1$-$C_{12}$ alkane moieties and R" and R'" may be connected to form a cyclic structure.

14. A process according to claim 7 wherein the organic hydroxyperoxide is a tertiary hydroperoxide selected from the group of tert-butyl hydroperoxide, tert-amyl hydroperoxide, 1,1,3,3-tetramethylbutyl hydroperoxide, 2-hydroperoxy-2-methyl pentane, 2-hydroperoxy-2-methyl-3-butene, 2-hydroperoxy-2,4,4-trimethyl pentane, 2,5-dihydroperoxy-2,5-dimethyl hexane, 2,5-dihydroperoxy-2,5-dimethyl-3-hexyn, 2,6-dihydroperoxy-4-hydroxy-2,6-dimethyl heptane, 2-hydroperoxy-4-hydroxy-2-methyl butane, 2-hydroperoxy-4-hydroxy-2-methyl pentane, 2-hydroperoxy-4-hydroxy-2-methyl heptane, 3-ethyl-3-hydroperoxy-5-hydroxy hexane, cumyl hydroperoxide (2-phenyl-2-hydroperoxy propane), m- and p-isopropylcumyl hydroperoxide, m- and p-(tert-butylperoxy isopropyl)cumyl hydroperoxide, 1-hydroperoxy-1-methyl cyclohexane, 1-hydroperoxy-5-hydroxy-1,3,3-trimethyl cyclohexane, p-menthane hydroperoxide, and pinane hydroperoxide, the organic hydroperoxide most preferably being selected from tert-butyl hydroperoxide, tert-amyl hydroperoxide, and 1,1,3,3-tetramethylbutyl hydroperoxide.

15. A process according to claim 11 wherein the organic peroxide has a half-life of at most 0.3 hours at the polymerization temperature.

* * * * *